United States Patent [19]

Noll et al.

[11] Patent Number: 5,306,159
[45] Date of Patent: Apr. 26, 1994

[54] SEQUENTIAL MATING OF CONNECTORS OF MULTIPLE FRAMED CIRCUIT BOARD ASSEMBLY

[75] Inventors: Gregory B. Noll, Riverside; Theodore R. Conroy-Wass, Tustin, both of Calif.

[73] Assignee: Hughes Aircraft Company, Los Angeles, Calif.

[21] Appl. No.: 922,905

[22] Filed: Jul. 31, 1992

[51] Int. Cl.⁵ .............................................. H01R 9/09
[52] U.S. Cl. ........................................ 439/61; 439/362
[58] Field of Search .................. 439/362, 369, 61, 248

[56] References Cited

U.S. PATENT DOCUMENTS

| | | | |
|---|---|---|---|
| 2,365,101 | 12/1944 | O'Brien | 439/362 |
| 3,668,608 | 6/1972 | Ziegler, Jr. | 439/248 |
| 4,645,282 | 2/1987 | Frear | 439/364 |
| 4,906,197 | 3/1990 | Noll | 439/364 |
| 5,120,243 | 6/1992 | Mee | 439/364 |
| 5,195,900 | 3/1993 | Kumagai et al. | 439/364 |

*Primary Examiner*—Eugene F. Desmond
*Attorney, Agent, or Firm*—Elizabeth E. Leiterge; Terje Gudmestad; W. K. Denson-Low

[57] ABSTRACT

A multiple circuit board assembly includes stacks (50,52) of printed circuit boards each having a series of hermaphroditic edge connector nodes (46,46a, 82) that electrically connect a printed circuit board (56) of one stack to a plurality of boards of a second stack. Each board edge also includes a service cable connector (74) having electrical power and fiber optic input/output connector elements (161,163) that connect the board to a spring mounted service module connector receptacle (42) in a housing structure (16) that carries the assembled stacks of printed circuit boards. To avoid misaligning forces on the pressure type edge connector node contact elements as these engage one another, the service module connector plug (74) and receptacle (42) are initially spaced from one another at the time of mating contact of the edge connector nodes, and a spring mounted threaded nut (124) and screw (224) arrangement of the plug and receptacle is caused to be resiliently engaged to enable the plug and receptacle to be drawn to one another by the threaded securing elements.

12 Claims, 5 Drawing Sheets

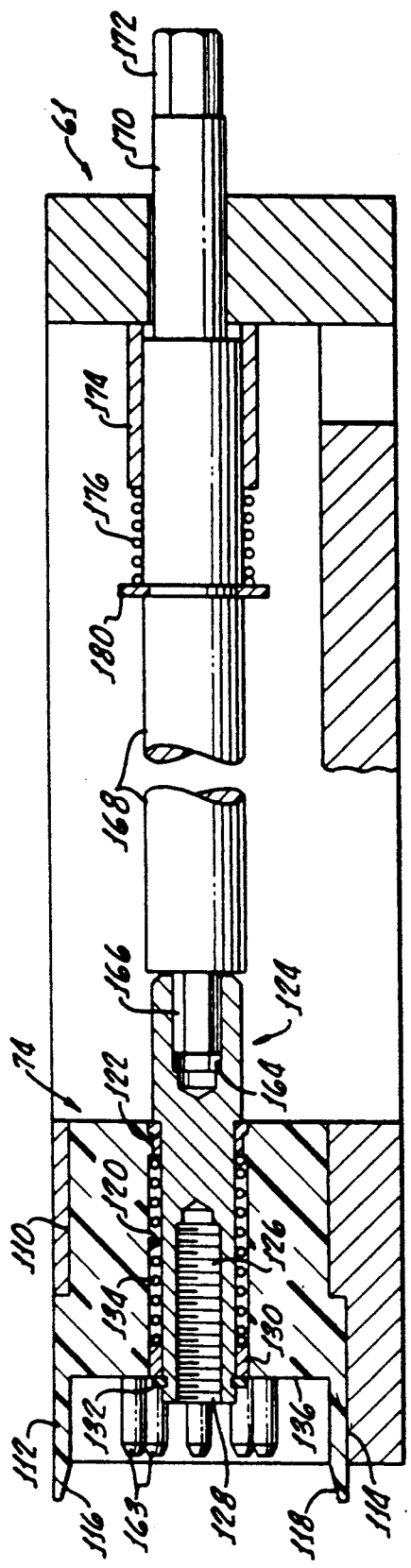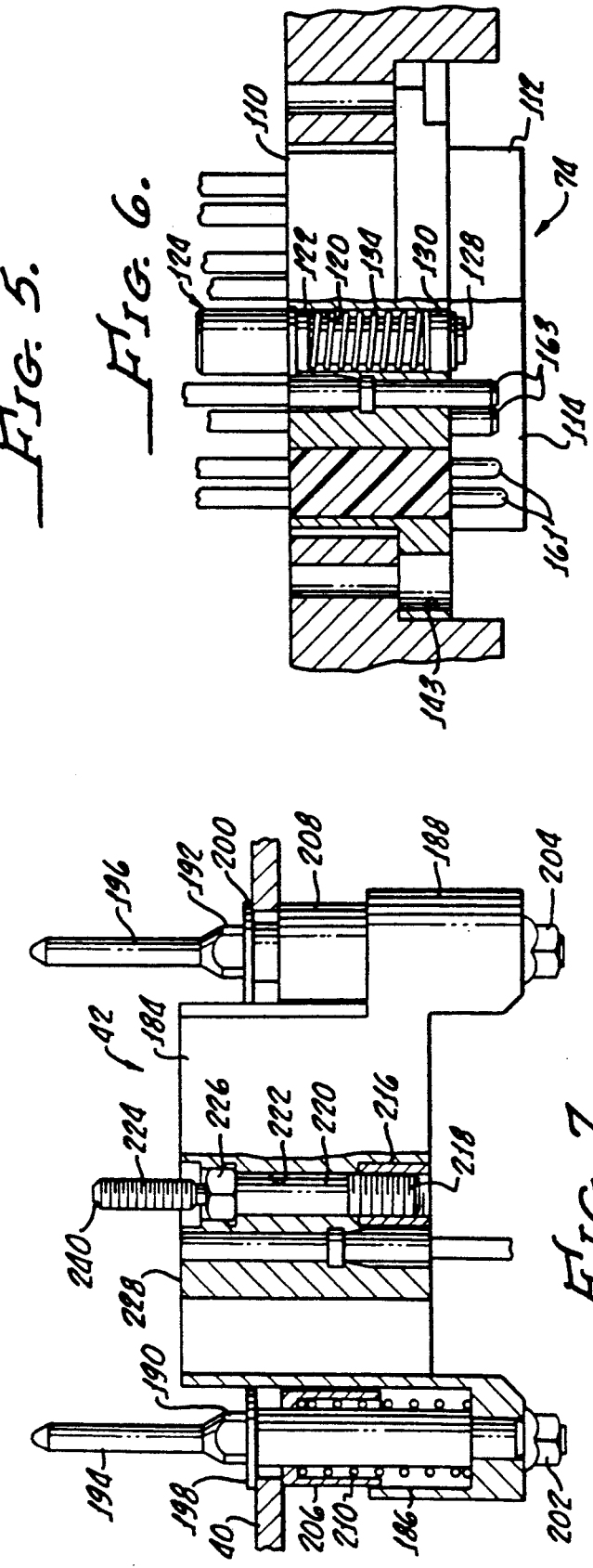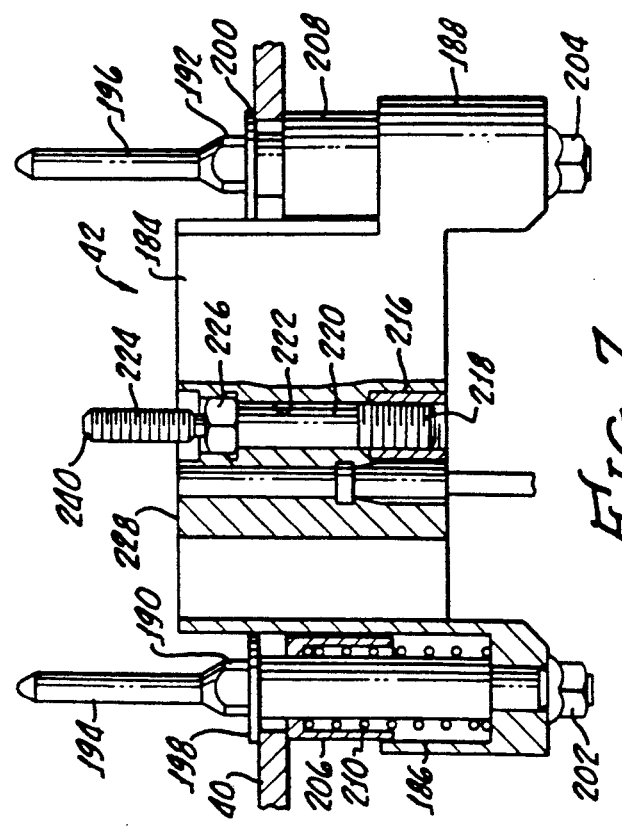

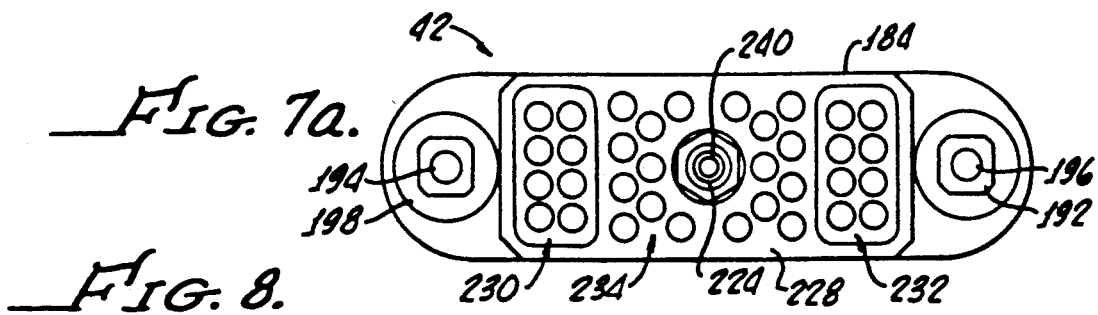
Fig. 7a.
Fig. 8.
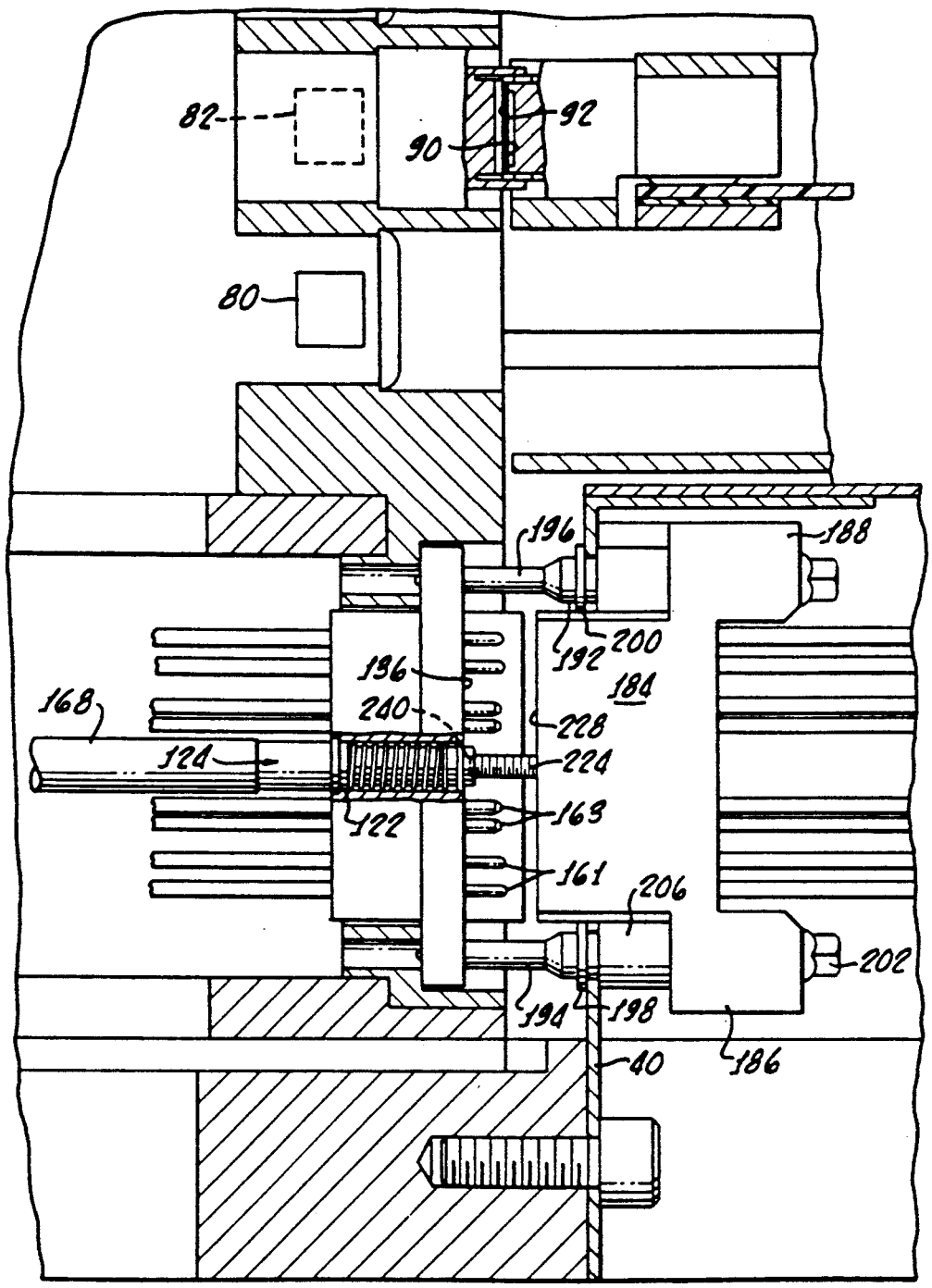

SEQUENTIAL MATING OF CONNECTORS OF MULTIPLE FRAMED CIRCUIT BOARD ASSEMBLY

This application is related to the following U.S. patent applications all filed concurrently herewith, the disclosures of which are incorporated herein as though fully set forth: Double Ended Hermaphroditic Signal Node Module Assembly, Ser. No. 07/922,909, filed Jul. 31, 1992; Printed Circuit Board Frame Module Assembly, Ser. No. 07/923,415, filed Jul. 31, 1992; Multimodule Terminating Plane Assembly, Ser. No. 07/923,189 filed Jul. 31, 1992; and Printed Circuit Board Mounting Cage, Ser. No. 07/923,201, filed Jul. 31, 1992. All of these applications are assigned to the assignee of the present application.

BACKGROUND OF THE INVENTION

1. Field of the Invention

The present invention related to printed circuit board assemblies and more particularly concerns an arrangement for sequentially engaging different connector parts on a single circuit board and an improved connector assembly.

2. Description of Related Art

In arrangements described in the above-identified co-pending applications, first and second stacks of parallel closely spaced circuit boards are directly connected to one another in a edge to edge relation. Each printed circuit board has an edge provided with a series of hermaphroditic connector nodes to enable circuit boards to be connected directly to one another in edge to edge relation. The two stacks of boards are mounted in a structural housing cage which carries an array of service cable connector receptacle parts, each one of which connects with a service cable connector plug part that is carried by an individual one of the printed circuit boards. The hermaphroditic connector nodes employ pressure type contact elements, sometimes called "contact dots", "bumps" or "buttons", providing an array of raised conductive dots on one connector node that is firmly pressed against a mating array of raised conductive dots on a mating connector node. This provides electrical signal contact and transmission of the data signals between the nodes and therefore between the printed circuit boards to which the nodes are mounted. However, for coupling of input/output signals and electrical power, each connector board includes a plurality of service cables connected to a service cable connector part, such as a plug, which is arranged to mate with a service cable receptacle part carried on the housing structure that mounts the circuit board stacks. Connections between the service cable connector parts require a significant degree of motion of the parts toward one another, and a greater amount of force, to fully engage the pin and socket type connections that are employed for power and input/out signals.

To interengage raised dots of the connector nodes, the boards are moved into position and pressed against one another by a camming lever before the connector elements of the service cable connector parts are engaged so as to avoid any misalignment forces on the raised dot connections caused by tolerances in dimensions of the parts. A screw and nut arrangement is provided on the service cable connector parts to pull these together and fully engage their pin and socket connector elements after the raised dot node pressure connections are made. However, since there is no further motion available for the printed circuit board itself after connection of the raised do connections of the connector nodes, it is imperative that the screw and nut securing elements of the service cable connector parts be so positioned on interengagement of the raised dot connector elements that mere rotation will threadedly interengage the screw and nut so as to pull the service cable connector parts together. The nut and screw must not be allowed to engage one another before completion of the pressure type contact of the raised dots or they might interfere with or prevent full pressure contact of the raised dots. To meet such rigorous requirements the parts must be made to very tight dimensional tolerances, which greatly increases cost of manufacture. Because of the difficulty of obtaining and maintaining such tolerances during repeated insertion and detachment of individual circuit board assemblies, reliability of circuit connections is significantly decreased.

Accordingly, it is an object of the present invention to provide for multiple connections that avoid or minimize above mentioned problems.

SUMMARY OF THE INVENTION

In carrying out principles of the present invention in accordance with a preferred embodiment thereof, first and second support members, each bearing electrical circuitry and having a connector part thereon connected to the circuitry, are detachably mounted to a housing structure in a mated position wherein the connector parts are connected with one another to transmit signals between the support members. One of the support members includes a third connector part having connector elements, and a fourth connector part is movably mounted on the housing structure independently of the support members, with the fourth connector part having connector elements positioned to be adjacent to but not engaged with the third connector part elements when the support members are in mated position, and when the connector parts of the first and second support members are interconnected with one another. Means are resiliently mounted on the first support member for driving the fourth connector part toward the first support member and toward the third connector part after the first and second support members are in mated position.

According to a feature of the invention, the driving means include first and second interengageable threaded members mounted respectively on the third and fourth connector parts, with one of these threaded members being resiliently urged toward the other and configured and arranged to be resiliently pressed against the other to ensure initial threaded engagement of the two when the first and second support members are in mated position.

BRIEF DESCRIPTION OF THE DRAWINGS

In the accompanying drawings:

FIG. 5 is a side view, with parts broken away, of a spring pressed jack nut and drive handle mounted in one of the circuit boards;

FIG. 6 is a fragmentary sectional view of a service cable plug part mounted on a circuit board;

FIG. 7 is a side view, with parts broken away, of a service cable connector receptacle resiliently mounted in a mid-plane terminating panel of the housing structure;

FIG. 7a is a front view of a connector plug part;

FIG. 8 is a fragmentary sectional view showing an hermaphroditic connector node of a circuit board connected to a similar node of a second circuit board and a service cable connector plug part of the first circuit board in position to be subsequently mated to the service cable receptacle mounted in the housing structure.

DESCRIPTION OF THE PREFERRED EMBODIMENTS

Figure 1:
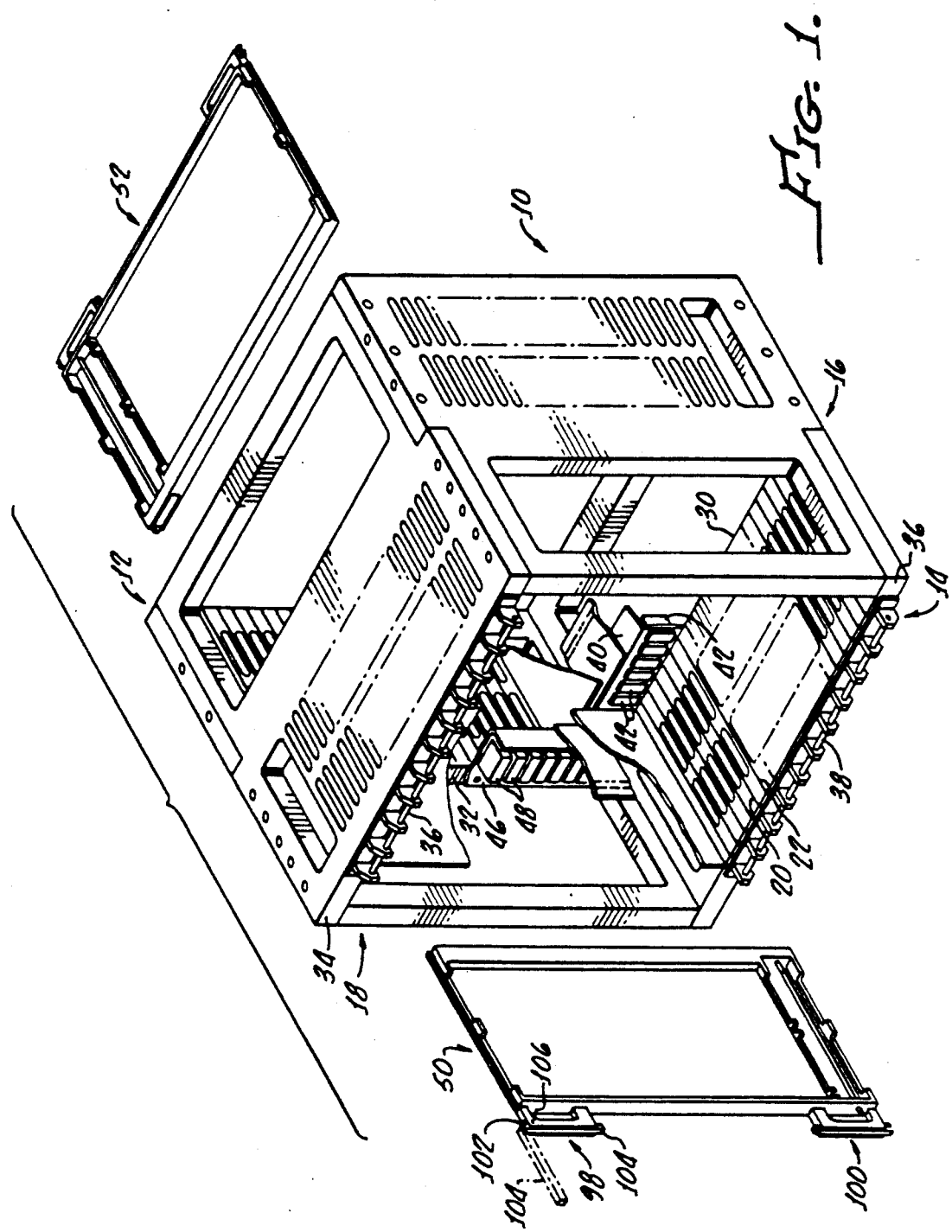
FIG. 1 illustrates first and second stacks of circuit boards mounted in a housing structure in an arrangement employing connectors embodying principles of the present invention.

FIG. 1 shows an assembly of first and second stacks of mutually parallel and closely spaced printed circuit board assemblies. An assembly housing structure or support cage 10 is formed of strong, rigid top and bottom panels 12,14 rigidly interconnected to right and left side panels 16,18 to form a rectangular frame that is completely open at both front and back. The structure illustrated in FIG. 1 is more particularly described in the above-identified co-pending patent application for Printed Circuit Board Mounting Cage. Each panel is formed with a plurality of grooves, such as grooves 20,22 on its inner surface extending to an intermediate edge 30 for bottom panel 14 and to an intermediate edge 32 for left side panel 18. These panel intermediate edges form sides of relatively large access windows in portions of the panel adjacent the surfaces bearing grooves 20,22. Fixed to forward edges 34,36 of top and bottom panels 12 and 14, respectively, are latching rods 36,38.

A first mid-plane terminating panel 40 is fixed to edge 30 adjacent ends of grooves 20,22 and carries an array of service cable floating connector receptacles 42. A vertically disposed mid-plane terminating panel 46 is fixed to edge 32 of left side panel 18 and carries a vertically extending array of floating service cable connector receptacles 48.

The cage is arranged to mount first and second stacks of printed circuit board frame module assemblies, such as printed circuit board assembly 50, which represents a first stack in this illustration. Other boards of this stack are not shown in FIG. 1, but all are mutually parallel and closely spaced, there being one board assembly slidably received in each of grooves 20, 22, etc. Printed circuit board assembly 52 represents a second stack in this illustration. The stack including board assembly 52 is identical to the first stack but oriented at right angles thereto. The printed circuit board assemblies of each stack are mounted in closely spaced parallel planes, with the boards of the stack represented by board 50 being vertically oriented and mounted in parallel closely spaced vertical planes, and the boards of the stack represented by board 52 being mounted in closely spaced parallel horizontal planes.

Figure 2:
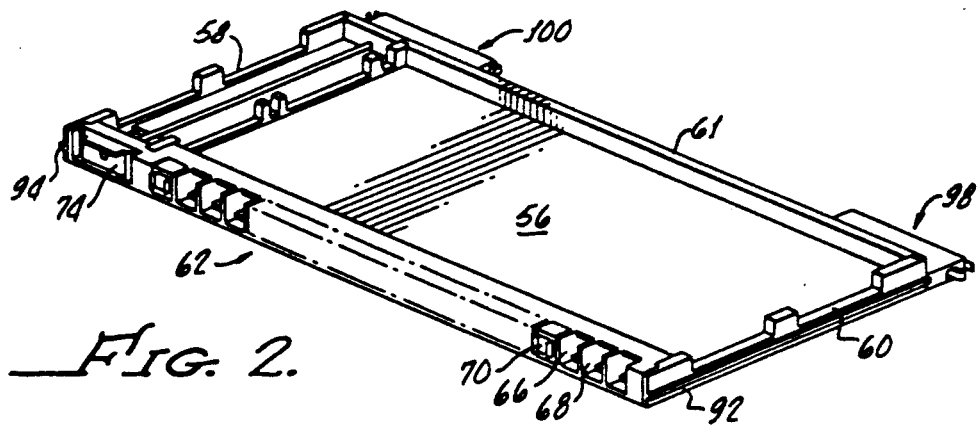
FIGS. 2 and 3 are pictorial illustrations looking at different sides of a single assembled printed circuit board and frame module assembly.
Figure 3:
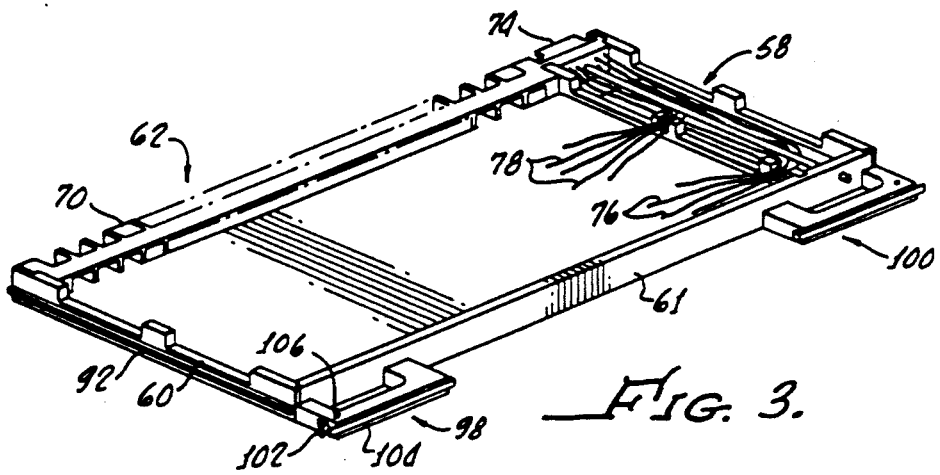

Each board includes a circuit board 56 (FIGS. 2 and 3) mounted in a rigid rectangular frame, including a channel side rail 58, a second side rail 60 and a face plate 61, all rigidly interconnected with one another. Fixedly clamped to the front edge of the board and connected to ends of side rails 58,60 is a node carrier 62 having a plurality of pockets, such as pockets 66,68, each of which is adapted to carry an hermaphroditic connector node, such as node 70 shown in FIG. 2. The rigid node carrier 62 extends along the entire front edge of the circuit board, and at one end thereof includes a rectangular aperture in which is mounted a service cable connector plug part in the form of a connector plug 74. A plurality of service cables, such as power cables 76 and fiber optic input/output cables 78, are connected to various elements on the circuit board and routed along the side rail 58 to connecting pins in service cable connector plug part 74. The fiber optic cables are connected to electrical circuities on the board by optical/electrical connectors (not shown) mounted on the board.

Figure 4:
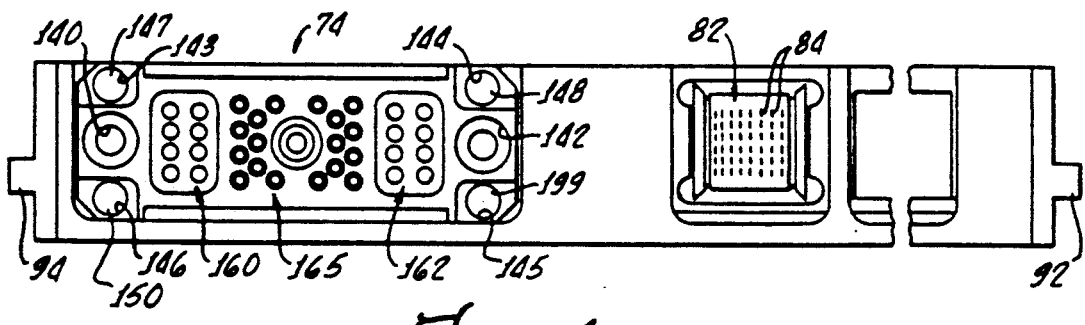
FIG. 4 is a view of a portion of parts of the front of a connector node carrier secured to an edge of one circuit board.
Figure 9:
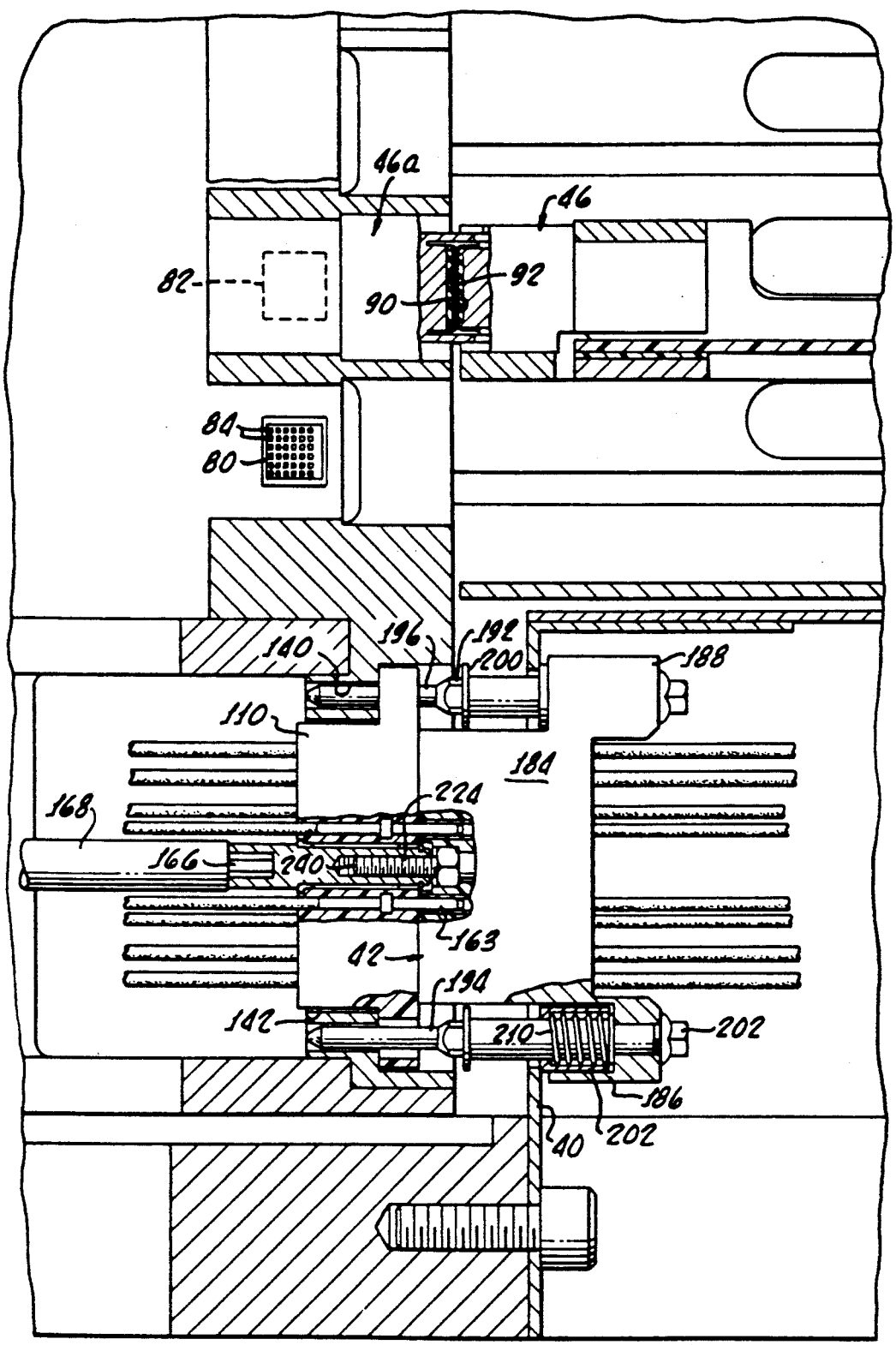
FIG. 9 is a view similar to the illustration of FIG. 8 showing both the hermaphroditic connector node and the service cable connector plug and receptacle parts in fully mated condition.

Each circuit board includes along its front edge a plurality of spaced electrical signal data connection pads 80,82 (see FIGS. 4 and 9) having a pattern of electrically conductive raised dot connector elements 84 thereon. Each hermaphroditic connector node, such as connector node 46a of FIG. 9, includes a plurality of circuit board connecting raised dot pressure connecting elements (not shown) on a side thereof in contact with the array of board contact raised dots 84, with the side contact elements of the connector node being electrically connected within the node to the pattern of raised dots 84 on the face 90 (FIG. 9) of the connector node. Thus when the face 90 of the connector node 46a is pressed against a corresponding face 92 of a mating connector node 46 of another board assembly, as illustrated in FIG. 9, electrical data signal connection is made through the raised dot pressure contact arrays of the two nodes, to thereby provide electrical paths for flow of data from one circuit board to the other through these contacting nodes.

Each side rail of the circuit board frame includes an outwardly projecting guide rib, such as ribs 92,94 (FIGS. 2, 3 and 4), which are slidably received in grooves, such as grooves 20,22 of one of the cage panels and corresponding grooves of the oppositely disposed cage panel. Thus each circuit board assembly may be slidably inserted into the cage from the front opening for the boards of the stack represented by board 50, and through the back opening for the boards of the stack represented by 52. Each circuit board frame carries at its rear face plate 62 a pair of handles 98,100, having lever operated latching cams, such as cam 102 that is carried on the end of a lever 104 pivoted in the handle about a pivot pin 106.

When inserting the circuit board the handle 104 is pivoted outwardly to the dotted line position shown in FIG. 1 to pivotally retract the latching cam 102 and to allow this cam to pass beneath the latching rod 36 as the circuit board reaches its near final insertion position within the housing structure. Thereupon, lever 104 is pivoted relative to the handle 98 to cause the cam 102 to engage latching rod 36 and pull the circuit board a small further distance into its final mated position within the housing structure.

All of the service cable connector plugs 94 are the same, there being one for each circuit board, and fixedly mounted in the circuit board carrier housing. Each includes a body 110 (FIGS. 5 and 6) having upper and lower forwardly projecting guide and protective shielding flanges 112,114, each of which has a chamfered free edge 116,118. A bore 120 extends through the connector body and fixedly carries a stop sleeve 122 at an inner end thereof. A jack nut 124 is slidably mounted in the bore 120 to slide axially along sleeve 122. A forward end of the jack nut 124 is formed with a threaded bore 126 opening at the forward end 128 of the jack nut. A short spacer sleeve 130 circumscribes a portion of the jack nut adjacent its forward end and is held in place by a retaining ring 132 that is mounted in a circumferential groove adjacent the end of the jack nut. Interposed between a rearwardly facing end of the spacer sleeve 130 and fixed stop sleeve 122 is a compression spring 134 that operates to resiliently urge the jack nut forwardly with respect to body 110 so that end 128 will normally project a small distance outwardly beyond the forward face 136 of connector plug body 110. Forward face 136 also includes a pair of guide pin receiving apertures 140,142 (FIG. 4) and a plurality of apertures 143,144,145 and 146 that receive bolts (not shown) that secure the connector body to the circuit board node carrier 60.

Also formed in the front portion of the connector body 110 are groups of apertures 160,162,165 that mount power cable pins, such as pins 161, and fiber optic pins, such as pins 163 (FIGS. 5 and 6).

The rearward end of jack nut 124 (FIG. 5) is formed with a bore 164 of hexagonal, or other non-rectangular cross-section, opening to the inner end of the jack nut for reception of an hexagonal or other non-rectangular mating necked down end 166 of an extension shaft 168. Shaft 168 includes a necked down end portion 170 that slidably extends through and is journaled in the face plate frame member 61 of the circuit board and includes an hexagonal shaped tool receiving end 172 to facilitate rotation of the shaft and jack nut. A sleeve 174 which slidably receives shaft 168 abuts the inner side of frame 61 to provide a stop for a compression spring 176 that circumscribes a portion of the shaft 168. The forward end of spring 166 abuts a retaining ring 180 fixedly mounted in a circumferential groove on the shaft 168.

The other part of the service cable connector, a service cable connector receptacle 42 that is mounted on mid-plane terminating panel 40, is shown in detail in FIG. 7. Connector receptacle part 42 comprises a main body section 184 having laterally extending housing sleeve sections 186,188 on either side thereof with a guide pin 190,192 fixedly mounted to the housing sleeve and extending through the housing sleeve, through an aperture in the mid-plane terminating panel 40 to a guide pin section 194,196. A washer 198,200 is fixedly connected with the guide pin and bears upon the outer surface of mid-plane terminating panel 40, against which it is pulled by means of a nut 202,204 threaded on the inner ends of the guide pins. Pressure sleeves 206,208 circumscribe the guide pins and bear against the inner surface of the mid-plane terminating panel 40. A compression spring 210 and a similar spring (not shown) are captured within the housing sleeves 186,188 and pressure sleeves 206,208 to resiliently urge the housing sleeves, and thereby the entire body of connector part 42, away from the mid-plane terminating panel 40, which is in the direction that is away from the other connector part 74. By means of only the washers 198,200, the nuts 202,240 and springs 210, the receptacle is loosely mounted to the panel 40. Accordingly, the receptacle is free to "float", e.g. move a limited amount in all directions and to tilt. An internally threaded sleeve 216 threadedly receives a necked down portion 218 of a shaft 220 extending through a bore 222 in housing body 184. A screw section 224 is threaded into the an end of shaft 220 and fixed thereto by a nut 226. Screw section 224 extends outwardly of a mating surface 228 of connector part body 184, but not so far as do the guide pin sections 194 and 196.

As can be seen in the front view of the face 228 of connector receptacle part 42 (FIG. 7a), the body 184 is provided with groups of sockets 230,232 for reception of electrical power pins of the plug part 74 and a group of fiber optic connector sockets 234 for reception of fiber optic connector pins mounted on the plug connector part 74.

In assembly of the circuit boards into the housing structure cage 10 the several boards of the two stacks may be inserted in any desired order. In one arrangement, for example, all boards of the horizontal stack of boards, represented by board 52 (FIG. 1), are inserted through the back opening of the housing cage structure with their guide ribs slidably guided in the opposing pairs of grooves formed in the right and left side panels 16 and 18. The boards are all inserted, as previously mentioned, with the cam levers 104 in open position until the cams 102 are in position adjacent the latching rod for these boards. These rods extend vertically on the rear facing edges of right and left side panels 16,18 and not shown in FIG. 1. The rods are identical to rods 36,38 but are vertically oriented. The boards are latched in position and then the boards of the other stack may be inserted in the same manner as described in connection with the boards of the first stack, except, of course, that the boards of the stack represented by board 50 are inserted in vertical orientation, as illustrated in FIG. 1, with their guiding ribs 92 and 94 received in opposing pairs of grooves in top and bottom panels 12 and 14. Each board is inserted to an initial position in which the cams of its handles are in position to grasp the latching rods 36,38, at which time the raised dot pressure connecting elements of the connector nodes are approximately ⅛ to 1/16 of an inch from their final mating position.

The cam levers 104 of each board are then moved into latching position and the board is moved inward an addition 1/5 to 1/16 of and inch and is latched by the cams 102. This causes the raised dot pressure connecting elements of the node connectors to become fully engaged, as shown in FIG. 8. Nevertheless, in this position the service cable connector parts have their electrical power connecting elements 161 and fiber optic elements 163 disengaged, and these parts are in the unmated condition as shown in FIG. 8. This position may be termed the "node mated" position, as distinguished from the service connector mated condition wherein the parts of the service connectors are fully electrically and optically engaged, as illustrated in FIG. 9. It is important to note that in the node mated condition shown in FIG. 8 the guide pin sections 194,196 of the connector receptacle part 42 have entered the guide apertures of the service cable connector plug part 74, but the electrical power cables and optical fiber optic connector pins and sockets of the several parts are not yet engaged with one another. Metal guide plates which extend outwardly from the body 110, cooperate with the guide pins 194,196 to provide protection and electrical shielding for projecting electrical cable and fiber optic coupling pins that project outwardly of the face 136 of connector part 74, and, furthermore, in the node mated position have initially engaged opposite surfaces of the body 184 of service cable connector receptacle part 42.

When the circuit board was inserted into the housing cage structure and when the raised dot contacts of the nodes of opposed circuit boards contact one another, the end 240 of screw 224 of service cable connector receptacle part 42 engages the projecting end 128 of jack nut 124 and pushed the jack nut back toward the body 110 of the connector plug part 74. It is important to note that the spring urged projection of the jack nut 124 ensures that the end of the jack nut will contact the end of screw 224 as the circuit board moves into node mated position wherein the raised dot pressure connector elements are pressed against one another for electrical signal contact. If one or the other of the jack nut 124 and screw section 224 were not mounted to enable resilient axial retraction, and moreover were not mounted so as to accomplish such retraction when the parts are in node mated condition, it would be difficult, if not impossible, to manufacture and assemble both the screw and nut to such precision tolerances that proper contact would occur between screw end 240 and nut end 128 when the apparatus is in node mated condition. If the screw or nut were too long (in the absence of the spring loading of one of these elements), contact could be made before the raised dot connections were made, and thus effectively prevent the raised dot contacts from mating. If the screw or nut were too short, the ends 240 and 128 might not contact each other at all in node mated condition, so that subsequent rotation of shaft 168 would fail to rotatably and threadedly interengage the parts.

Therefore, in the node mated condition illustrated in FIG. 8 the connector parts 74 and 42 are aligned by engagement of the alignment pins, the screw and nut have their ends pressed against one another, with the jack nut spring partly compressed, but the electrical power and optical pin and socket connecting elements are still unmated. Now the extension shaft 168 may be rotated by application of a suitable tool to tool head 172 of the shaft to forcibly drive the two together as the screw 224 is threadedly drawn into the jack nut. In the course of this motion the springs 210, which tend to urge connector part 42 away from connector part 74, are compressed and the two connector parts are driven into the fully mated condition wherein surfaces 228 and 136 of the two parts are pressed against one another, and of course the fiber optic connecting elements and electrical power elements are similarly connected. One or more of the electrical pins of the connectors 42,74 are longer than the others and arranged so that in the course of assembly these will make contact before contact of the other electrical power pins and the fiber optic components, thereby enabling electrical grounding to occur first.

Spring 176 on the extension shaft 168 presses the latter against the innermost end of the jack nut 124 and thus stabilizes the position of the jack nut, helping to hold it in its extended position. The spring also allows the jack nut to be driven back into the connector body by the initial contact with the end of the screw section 224 when the inner end of the jack nut 124 may bear against the forward end of the extension shaft 168. Further, spring 176 allows the extension shaft 168 to be retracted without retracting the jack nut itself so as to allow disengagement of the necked down shaft extension portion 166 from the bore 164 of the jack nut. To enable such disassembly the length of the compression spring 176 and the magnitude of motion of the extension shaft relative to the sleeve 174 are arranged to be slightly greater than the length of the shaft extension portion 166 that is inserted into the bore 164 of the jack nut.

The described arrangement enables manufacture of the parts with a significantly wider tolerance in assembly. Particularly in the described assembly of stacks of multi-connector node circuit boards forming rows of compression interconnections, the large number of electrical interconnections require larger amounts of tolerance for successful assembly. Further, incorporating fiber optic connectors into the same unit, that is, mounting them on the same node carrier, further increases the magnitude of required tolerance in order to avoid adverse impact of the optical fiber connecting forces on the node connections. For optimum interconnection of fiber optic connecting elements it is common to drive the two together with a significant insertion force. Misalignment of parts in the course of application of such force could very easily cause an unacceptable misalignment of the raised dot pressure connecting elements. However, as previously described, the disclosed arrangement enables full and complete contact of the pressure contact dot connectors before application of the high forces necessary for mating interengagement of electrical power and fiber optic connecting elements. The arrangement further allows greater tolerance in the floating mounting of the several cable connector receptacle parts in the respective mid-plane termination panels. The large numbers of service cable connector parts mounted on a single mid-plane termination panel and large numbers of connecting nodes collectively require greater tolerances, which tolerances are made more acceptable by the configuration of the present invention.

What is claimed is:

1. Signal connecting apparatus comprising:
   a housing structure,
   first and second support members each having a connector node and circuitry connected to its connector node,
   means for detachably mounting said members to said structure and fixedly securing said members to each other in a node mated position wherein said connector nodes are connected with one another to transmit signals between said support members,
   a third connector part on said first support member, said third connector part having connector elements,
   a fourth connector part movably mounted on said housing structure independently of said support members, said fourth connector part having connector elements positioned to be adjacent to but not connected with said third connector part elements when said support members are in node mated position, and
   means resiliently mounted on one of said first support members and fourth connector part for driving said fourth connector part toward said first support member and said third connector part so as to cause said fourth connector part to resiliently initially engage said third connector part when said members are in said node mated position.

2. The apparatus of claim 1 wherein said first and second support members comprise first and second printed circuit boards, said connector parts comprising first and second edge connector nodes fixed to edges of respective ones of said boards, said third connector part comprising a service cable plug part having electrical power pins and fiber optic pins, said fourth connector part comprising a service cable receptacle part having power pin sockets and fiber optic pin sockets.

3. The apparatus of claim 2 wherein said means for driving comprises a jack nut resiliently mounted on said service cable plug part and resiliently urged outwardly of said plug part, a screw on said fourth connector part configured and arranged to threadedly engage said jack nut, said screw being resiliently pressed against said jack nut when said support members are in said node condition.

4. The apparatus of claim 1 wherein said fourth connector part includes a first threaded member extending from said fourth connector part toward said third connector part, and wherein said means for driving comprises a resiliently mounted second threaded member configured and arranged to threadedly engage said first threaded member to pull said third and fourth connector parts together.

5. The apparatus of claim 1 wherein said means for driving comprises a jack nut mounted to said third connector part for motion relative to said third connector part, and means for resiliently urging said nut away from said third connector part.

6. The apparatus of claim 5 including a shaft extension operatively engaged with said nut and movably mounted to said first support member for longitudinal motion, and means for resiliently urging said extension into operative engagement with said nut.

7. The apparatus of claim 1 wherein said fourth connector part includes a connector body and a first threaded member projecting outwardly from said body toward said third connector part, said third connector part including a body having a second threaded member projecting outwardly of said third connector body toward said first threaded member, one of said threaded members being mounted for axial motion relative to its associated body toward and away from the other of said threaded members.

8. The apparatus of claim 1 including a terminating panel fixed to said housing structure and wherein said fourth connector includes a connector body movably mounted to said panel and having a plurality of guide pin housings, a guide pin fixedly mounted in each housing and projecting outwardly of said body toward said third connector part, and spring means in each said housing concentric with the guide pin therein for urging the connector body away from said panel and away from said third connector part.

9. Signal connecting apparatus comprising:
a housing structure,
first and second support members each having circuitry connected to a connector part thereon,
means for detachably mounting said members to said structure in a mated position wherein said connector parts are connected with one another to transmit signals between said support members,
a third connector part on said first support member, said third connector part having connector elements,
a fourth connector part movably mounted on said housing structure independently of said support members, said fourth connector part having connector elements positioned to be adjacent to but not connected with said third connector part elements when said support members are in mated position,
means resiliently mounted on one of said first support member and fourth connector part for driving said fourth connector part toward said first support member and said third connector part, and
first and second printed circuit board stacks comprising a plurality of said first and second support members, all of said support members being detachably mounted in said structure, each of said first and second support members of said first and second stacks having circuitry and a data connector part thereon connected to said circuitry, each said first support member having a third connector part having third connector elements thereon, means for detachably mounting all of said first and second support members to said housing structure in a mated position wherein said data connector parts of said support members of said first stack are connected with data connector parts of support members of said second stack, a terminating panel fixed to said housing structure, a plurality of said fourth connector parts each movably mounted on said panel independently of said support members, each of said fourth connector parts having fourth connector elements positioned to be adjacent to but not mated with respective ones of said third connector part elements of respective first support members of said first stack, and means resiliently mounted on the support members of said first stack for driving each of said fourth connector parts toward an associated one of the third connector parts of said first support members of said first stack.

10. A multiple printed circuit board assembly comprising:
first and second stacks of printed circuit board frame module assemblies, the assemblies of each stack being positioned in mutually parallel, closely adjacent and spaced relation to one another, each of said assemblies of each stack comprising:
a printed circuit board frame having a front edge,
an elongated node carrier secured to said front edge,
a plurality of first connector nodes mounted in said node carrier,
the assemblies of said first stack being positioned in a first group of mutually spaced parallel planes,
the assemblies of said second stack being positioned in a second group of mutually spaced parallel planes that are perpendicular to the planes of said first group and movable to a node mated position wherein the node carriers of said first stack are operatively engaged with respective node carriers of said second stack,
each of said node carriers of said first stack having a service cable connector section and a service cable connector part mounted in such section,
a first mid-plane termination panel,
means for holding said mid-plane termination panel in fixed relation to the printed circuit board frame module assemblies of said first stack, said first mid-plane termination panel extending transversely across the carriers of said first stack in close proximity to the service cable connector parts of the carriers of said first stack, an array of service cable connector parts secured to said first mid-plane terminating panel, each service cable connector part of each node carrier comprising a body, a jack nut mounted in the body for motion between an extended position in which it projects outwardly beyond the body, and a retracted position, spring means circumscribing the nut for urging the nut to said extended position, and means for rotating the nut, each service cable connector part of said terminating panel comprising a panel connector body, a screw projecting outwardly beyond said panel body toward the service cable connector part of the associated node carrier, said screw contacting said jack nut and resiliently holding it in said retracted position when said assemblies are in said node mated position, said panel connector body having a plurality of guide pin housings, a guide pin fixedly mounted in each housing, spring means in each said guide pin housing circumscribing the guide pin therein and urging the panel connector body away from an associated connector part of the node carrier, and means for rotating said jack nut after contacting said screw to draw said screw and connector part of said panel toward said node carrier connector part.

11. A connector assembly comprising:

a first connector part having a plurality of first connector elements, a second connector part having a plurality of second connector elements, means for mounting said parts for motion toward each other to a pre-mated position wherein said first connector elements are spaced from said second connector elements, and means for pulling said connector parts together to place said first and second connector elements into mating engagement with each other, said means for pulling comprising:

an externally threaded member on said first connector part, an internally threaded member on said second connector part, at least one of said threaded members projecting outwardly of one of said connector parts toward the other of said thread members, means for resiliently urging one of said threaded members against the other when said parts are in said pre-mated position, said threaded members being urged against each other in end to end abutment when said parts are in said pre-mated position, and means for relatively rotating said threaded members.

12. The assembly of claim 11 wherein said threaded members comprise a screw and nut, and wherein said one threaded member is slidably mounted to said first connector part, and wherein said means for resiliently urging comprises a compression spring interposed between said first connector part and part of said one threaded member.

* * * * *